United States Patent
Goel (10) Patent No.: US 8,542,938 B2
(45) Date of Patent: Sep. 24, 2013

(54) SYSTEM AND METHOD FOR INTRA-FRAME COMPRESSION USING PREDICTIVE CODING

(75) Inventor: Anurag Goel, Panchkula (IN)

(73) Assignee: Entropic Communications, Inc., San Diego, CA (US)

( * ) Notice: Subject to any disclaimer, the term of this patent is extended or adjusted under 35 U.S.C. 154(b) by 1240 days.

(21) Appl. No.: 12/346,906

(22) Filed: Dec. 31, 2008

(65) Prior Publication Data

US 2010/0166327 A1    Jul. 1, 2010

(51) Int. Cl.
*G06K 9/36* (2006.01)

(52) U.S. Cl.
USPC .......................................................... 382/239

(58) Field of Classification Search
USPC ................................................. 382/232–253
See application file for complete search history.

(56) References Cited

U.S. PATENT DOCUMENTS

| 2006/0262983 | A1* | 11/2006 | Cheng et al. .................. 382/238 |
| 2007/0083578 | A1* | 4/2007 | Chen et al. ..................... 708/203 |
| 2008/0049845 | A1* | 2/2008 | Liu ............................ 375/240.27 |
| 2009/0003447 | A1* | 1/2009 | Christoffersen et al. 375/240.16 |
| 2009/0010338 | A1* | 1/2009 | Wang ........................ 375/240.16 |
| 2009/0097557 | A1* | 4/2009 | Takahashi et al. ........ 375/240.12 |
| 2009/0116549 | A1* | 5/2009 | Shen et al. ............... 375/240.02 |

* cited by examiner

*Primary Examiner* — Jingge Wu (74) *Attorney, Agent, or Firm* — Bruce Greenhaus; Richard Bachand; Duane Morris LLP (57) ABSTRACT

A system and method for intra-frame compression using predictive coding utilizes some pixels of a macroblock of a video frame as reference pixels to perform predictive coding on the rest of the macroblock when some or all predefined reference pixels for performing predictive coding on the macroblock are not available in the video frame.

20 Claims, 9 Drawing Sheets

```
┌─────────────────────────────────────────────┐
│ DETERMINE WHETHER A PREDEFINED REFERENCE    │─ 1002
│ GROUP OF PIXELS FOR PERFORMING PREDICTIVE   │
│ CODING ON A TARGET GROUP OF PIXELS OF A VIDEO│
│ FRAME IS AVAILABLE IN THE VIDEO FRAME       │
└─────────────────────────────────────────────┘
                     │
                     ▼
┌─────────────────────────────────────────────┐
│         IF AT LEAST SOME OF THE PIXELS OF   │─ 1004
│    THE PREDEFINED REFERENCE GROUP OF PIXELS │
│    FOR PERFORMING PREDICTIVE CODING ON THE  │
│  TARGET GROUP OF PIXELS OF THE VIDEO FRAME ARE│
│     NOT AVAILABLE IN THE VIDEO FRAME, SELECT A│
│      SET OF PIXELS FROM THE TARGET GROUP OF │
│      PIXELS AND PERFORM PREDICTIVE CODING ON│
│   THE REST OF THE TARGET GROUP OF PIXELS USING│
│       A RECONSTRUCTED VERSION OF THE SET OF │
│      PIXELS AS REFERENCE PIXELS TO COMPRESS │
│                 THE VIDEO FRAME             │
└─────────────────────────────────────────────┘
```

FIG. 1

|    | T1  | T2  | T3  | T4  |
|----|-----|-----|-----|-----|
| L1 | B1  | B2  | B3  | B4  |
| L2 | B5  | B6  | B7  | B8  |
| L3 | B9  | B10 | B11 | B12 |
| L4 | B13 | B14 | B15 | B16 |

| DC of B5 | DC of B6 | DC of B7 | DC of B8 |
|---|---|---|---|
| DC of B5 | DC of B6 | DC of B7 | DC of B8 |
| DC of B9 | DC of B10 | DC of B11 | DC of B12 |
| DC of B13 | DC of B14 | DC of B15 | DC of B16 |

FIG. 5

| DC of B2 | DC of B2 | DC of B3 | DC of B4 |
|---|---|---|---|
| DC of B6 | DC of B6 | DC of B7 | DC of B8 |
| DC of B10 | DC of B10 | DC of B11 | DC of B12 |
| DC of B14 | DC of B14 | DC of B15 | DC of B16 |

FIG. 6

| DC of B6 | DC of B6 | DC of B7 | DC of B8 |
|---|---|---|---|
| DC of B6 | DC of B6 | DC of B7 | DC of B8 |
| DC of B10 | DC of B10 | DC of B11 | DC of B12 |
| DC of B14 | DC of B14 | DC of B15 | DC of B16 |

| A | A | A | A | A | A | A | A |
|---|---|---|---|---|---|---|---|
| A | A | C<br>CS1 | C<br>CS1 | C<br>CS1 | C<br>CS2 | A | A |
| A | A | C<br>CS2 | C<br>CS2 | C<br>CS2 | C<br>CS2 | A | A |
| A | A | A | A | A | A | A | A |
| A | A | A | B<br>BS1 | B<br>BS1 | B<br>BS1 | B<br>BS1 | A |
| A | A | A | B<br>BS2 | B<br>BS2 | B<br>BS2 | B<br>BS2 | A |
| A | A | A | B<br>BS3 | B<br>BS3 | B<br>BS3 | B<br>BS3 | A |
| A | A | A | A | A | A | A | A |

SYSTEM AND METHOD FOR INTRA-FRAME COMPRESSION USING PREDICTIVE CODING

Embodiments of the invention relate generally to video coding systems and methods and, more particularly, to a system and method for intra-frame compression.

Video coding systems that utilize predictive coding to perform video compression, such as video coding systems according to H.264 video coding standard, generate predictions for target video data, e.g., a macroblock, of a video frame using reference video data from the video frame. A concern with such video coding systems is the availability of the reference video data. If some of the reference video data is not available from the video frame, the compression efficiency of the target video data may be reduced. Thus, there is a need for a system and method for intra-frame compression using predictive coding that can achieve compression efficiency when some or all of the reference video data is not available from the video frame for predictive coding the target video data of the video frame.

A system and method for intra-frame compression using predictive coding utilizes some pixels of a macroblock of a video frame as reference pixels to perform predictive coding on the rest of the macroblock when some or all predefined reference pixels for performing predictive coding on the macroblock are not available in the video frame.

In an embodiment, a method for intra-frame compression includes determining whether a predefined reference group of pixels for performing predictive coding on a target group of pixels of a video frame is available in the video frame, the predefined reference group of pixels not being a part of the target group of pixels, and, if at least some of the pixels of the predefined reference group of pixels for performing predictive coding on the target group of pixels of the video frame are not available in the video frame, selecting a set of pixels from the target group of pixels and performing predictive coding on the rest of the target group of pixels using a reconstructed version of the set of pixels as reference pixels to compress the video frame.

In an embodiment, a system for intra-frame compression includes a determining unit and a coding unit. The determining unit is configured to determine whether a predefined reference group of pixels for performing predictive coding on a target group of pixels of a video frame is available in the video frame, the predefined reference group of pixels not being a part of the target group of pixels. The coding unit is configured to select a set of pixels from the target group of pixels and to perform predictive coding on the rest of the target group of pixels using a reconstructed version of the set of pixels as reference pixels to compress the video frame if at least some of the pixels of the predefined reference group of pixels for performing predictive coding on the target group of pixels of the video frame are not available in the video frame.

In an embodiment, a method for intra-frame compression includes determining whether a predefined reference group of pixels for performing predictive coding on a rectangular macroblock of pixels of a video frame is available in the video frame, the predefined reference group of pixels not being a part of the rectangular macroblock, the predefined reference group of pixels including a horizontal subgroup of pixels bordering one edge of the rectangular macroblock and a vertical subgroup of pixels bordering another edge of the rectangular macroblock, and if at least one of the horizontal and vertical subgroups of pixels of the predefined reference group of pixels for performing predictive coding on the rectangular macroblock of the video frame are not available in the video frame, selecting a set of pixels from the rectangular macroblock and performing predictive coding on the rest of the rectangular macroblock using a reconstructed version of the set of pixels as reference pixels to compress the video frame.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
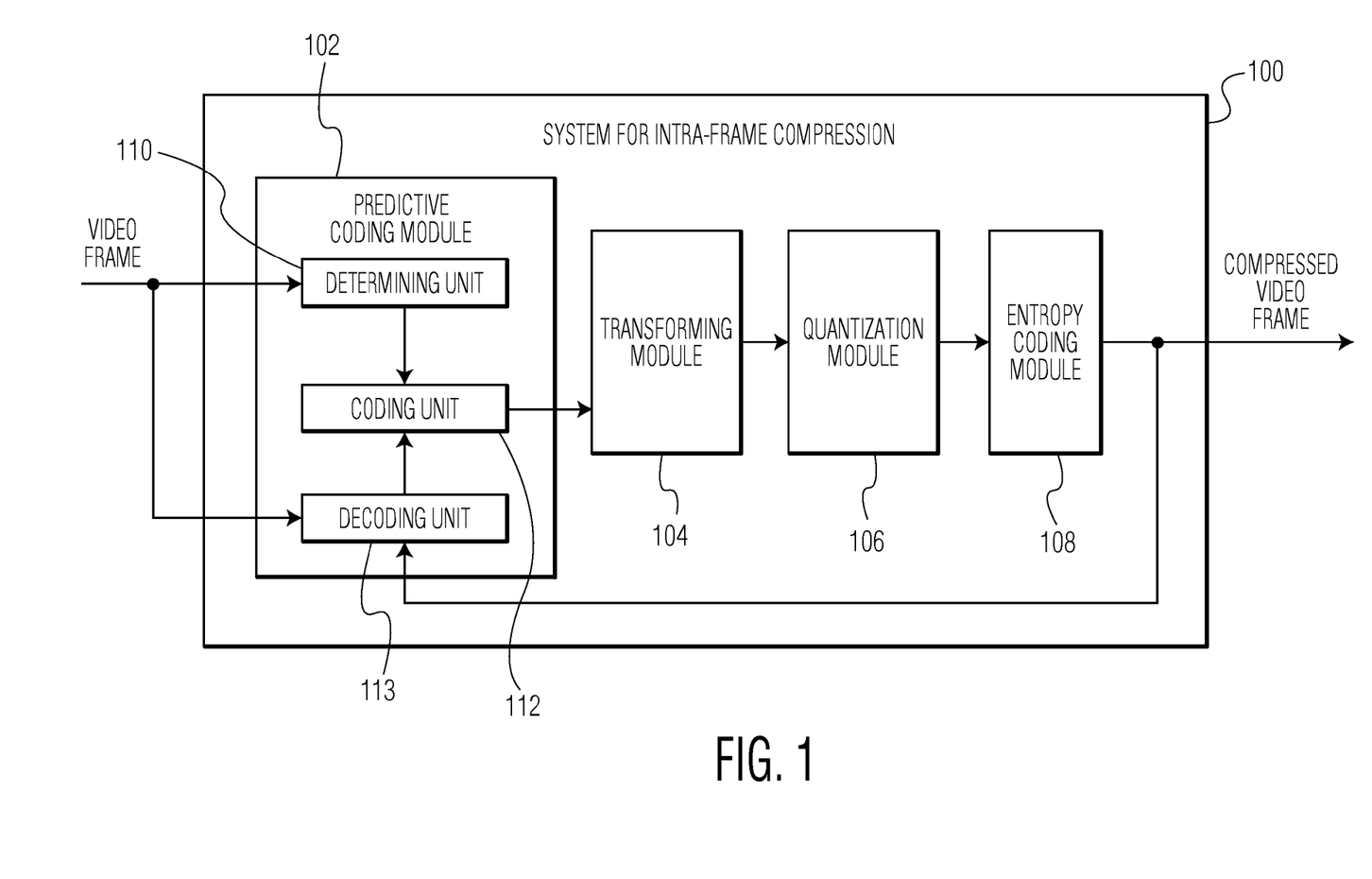
FIG. 1 is a schematic block diagram of a system for intra-frame compression in accordance with an embodiment of the invention.

FIG. 1 is a schematic block diagram of a system 100 for intra-frame compression in accordance with an embodiment of the invention. The system of FIG. 1 can be used to achieve video compression efficiency when some of video reference pixels are not available from a video frame for predictive coding target video data of the video frame. For example, the system can be used to improve H.264 video compression systems and scalable video codec (SVC) systems. The system can also be used for video data archiving and compressing medical imaging data. The system of FIG. 1 can be implemented in video processing servers, set top boxes and handheld multimedia devices.

As shown in FIG. 1, the system 100 includes a predictive coding module 102, a transforming module 104, a quantization module 106, and an entropy coding module 108. Although these modules of the system are shown as being separate components, some or all of these modules may be integrated into fewer components in other embodiments. These modules of the system may be implemented in software, hardware, firmware, or a combination of software, hardware, and firmware.

In the embodiment of FIG. 1, the predictive coding module 102 includes a determining unit 110, a coding unit 112, and a decoding unit 113. The determining unit is configured to determine whether a predefined reference group of pixels for performing predictive coding on a target group of pixels of a current video frame is available in the current video frame, where the predefined reference group of pixels is not a part of the target group of pixels. The coding unit is configured to select a set of pixels from the target group of pixels and to perform predictive coding on the rest of the target group of pixels using the set of pixels to generate residual data if some or all of the predefined reference group of pixels for performing predictive coding on the target group of pixels of the video frame is not available in the current video frame. For each pixel of the rest of the target group of pixels, the coding unit generates a prediction data using one or more reference pixels and subtracts the prediction data from the pixel to produce a residual data. The reference group of pixels may be compressed. The decoding unit is configured to decompress and reconstruct the reference group of pixels. In some embodiments, previously reconstructed reference group of pixels are input into the decoding unit. The decoding unit is also configured to decompress and reconstruct the set of pixels of the target group of pixels. The decoding unit may be configured to perform entropy decoding, inverse quantization, and inverse transformation on the compressed reference group of pixels and the compressed set of pixels of the target group of pixels. Although the decoding unit is shown as a part of the predictive coding module, the decoding unit may be separate from the predictive coding module in other embodiments.

The transforming module 104, the quantization module 106, and the entropy coding module 108 process the residual data from the predictive coding module 102 to produce a compressed version of the current video frame. The transforming module is configured to transform the residual data to generate transformed residual data. For example, the transforming module may perform a discrete cosine transform and a Hadamard transform on the residual data. The quantization module is configured to quantize the transformed residual data to generate quantized transformed residual data. The entropy coding module is configured to entropy code the quantized transformed residual data. For example, the entropy coding module may process the quantized transformed residual data coding to generate run-length symbols and then entropy code the run-length symbols.

Figure 2:
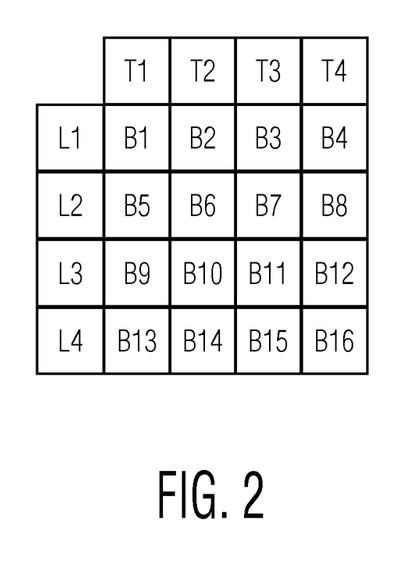
FIG. 2 depicts an exemplary target group of pixels of a video frame and a corresponding predefined reference group of pixels of the video frame for the system of FIG. 1.

FIG. 2 depicts an exemplary target group of pixels of a video frame and a corresponding predefined reference group of pixels of the video frame for the system 100 of FIG. 1. As shown in FIG. 2, the exemplary target group of pixels includes a 16×16 block of luminance (luma) pixels. Thus, the 16×16 block of luminance pixels is a rectangular block of pixels, in particular, a square block of pixels. The 16×16 block of luminance pixels is split into sixteen 4×4 luminance pixel blocks B1-B16. The corresponding predefined reference group of pixels includes four top horizontal reference luminance pixel blocks T1, T2, T3 and T4 (a horizontal subgroup of pixels) and four left vertical reference luminance pixel blocks L1, L2, L3 and L4 (a vertical subgroup of pixels), where each of these pixel blocks is also a 4×4 pixel block. The exemplary target group of pixels may be a macroblock of YCbCr 4:2:0 color format, which includes a 16×16 block of luminance pixels and two corresponding 8×8 blocks of chrominance (chroma) pixels. In the YCbCr color format, the macroblock of pixels includes a block of luminance pixels "Y," blue-difference and red-difference blocks of chrominance pixels "Cb" and "Cr." Predictive coding may be performed serially on the luminance pixels and the chrominance pixels, for example, first on the luminance pixels and then on the chrominance pixels. In some embodiments, the target group of pixels may have a color format different from the YCbCr 4:2:0 colors format such as a RGB (red, green, and blue) color format, which has different chrominance pixel block sizes.

The luminance pixel blocks B1-B16 may be oriented along a particular direction, where the values of the pixels along the particular direction are close to each other. As an example, the luminance pixel blocks B1-B16 may be oriented along the horizontal direction, where the values of the pixels in each row of the sixteen luminance pixel blocks B1-B16 are close to each other. As another example, the luminance pixel blocks B1-B16 may be oriented along the vertical direction, where the values of the pixels in each column of the sixteen luminance pixel blocks B1-B16 are close to each other. As another example, the luminance pixel blocks B1-B16 may be oriented according to a two dimensional plane, where the values of the luminance pixel blocks B1-B16 are close to each other according to a linear function. When some or all of the pixel blocks of the predefined reference group of luminance pixel blocks T1, T2, T3, T4, L1, L2, L3 and L4 are not available, some prediction modes may not be available according to H.264 video coding standard. Consequently, using current H.264 video standard, the luminance pixel blocks B1-B16 may not be efficiently compressed in a prediction mode according to the data orientation of the luminance pixel blocks B1-B16. As described below, the system 100 allows for the use of more prediction modes for some of the luminance pixel blocks B1-B16 so that these pixel blocks can be more efficiently compressed.

If some of the pixel blocks of the predefined reference group of luminance pixel blocks T1, T2, T3, T4, L1, L2, L3 and L4 are not available, the determining unit 110 informs the coding unit 112 of the determined availability of the predefined reference group of luminance pixel blocks. The coding unit performs predictive coding on the 16×16 block of luminance pixels that is split into sixteen 4×4 luminance pixel blocks B1-B16 in either an unmixed 16×16 intra mode or a mixed 16×16 intra mode. One bit is coded to indicate whether the unmixed 16×16 intra mode or the mixed 16×16 intra mode is used.

In the unmixed 16×16 intra mode, also referred to as the non-hybrid 16×16 intra mode, the coding unit 112 selects a set of 4×4 luminance pixel blocks from the sixteen luminance pixel blocks B1-B16 that depends which of the pixels blocks of the predefined reference group of luminance pixel blocks T1, T2, T3, T4, L1, L2, L3 and L4, if any, are available. Then, the coding unit performs predictive coding on the selected luminance pixel blocks in a single prediction mode that is selected from four intra prediction modes for a 16×16 block of luminance (luma) pixels according to H.264 video compression standard. One or more additional bits may be coded to indicate the selected prediction mode. The four intra prediction modes for a 16×16 block of luminance pixels according to H.264 video compression standard are described below with reference to FIG. 3. The selection of the prediction mode is dependent on the availability of the reference luminance pixel blocks T1, T2, T3, T4, L1, L2, L3 and L4. The coding unit then uses the selected luminance pixel blocks and the available reference luminance pixel blocks, if any, to perform predictive coding on the rest of the sixteen luminance pixel blocks B1-B16 in at least one prediction mode, which may be one of the four intra prediction modes and may be dependent on the data orientation of the rest of the luminance pixel blocks B1-B16. In some embodiments, the coding unit may explicitly specify a prediction mode for the rest of the luminance pixel blocks B1-B16 regardless of the data orientation.

Figure 3:
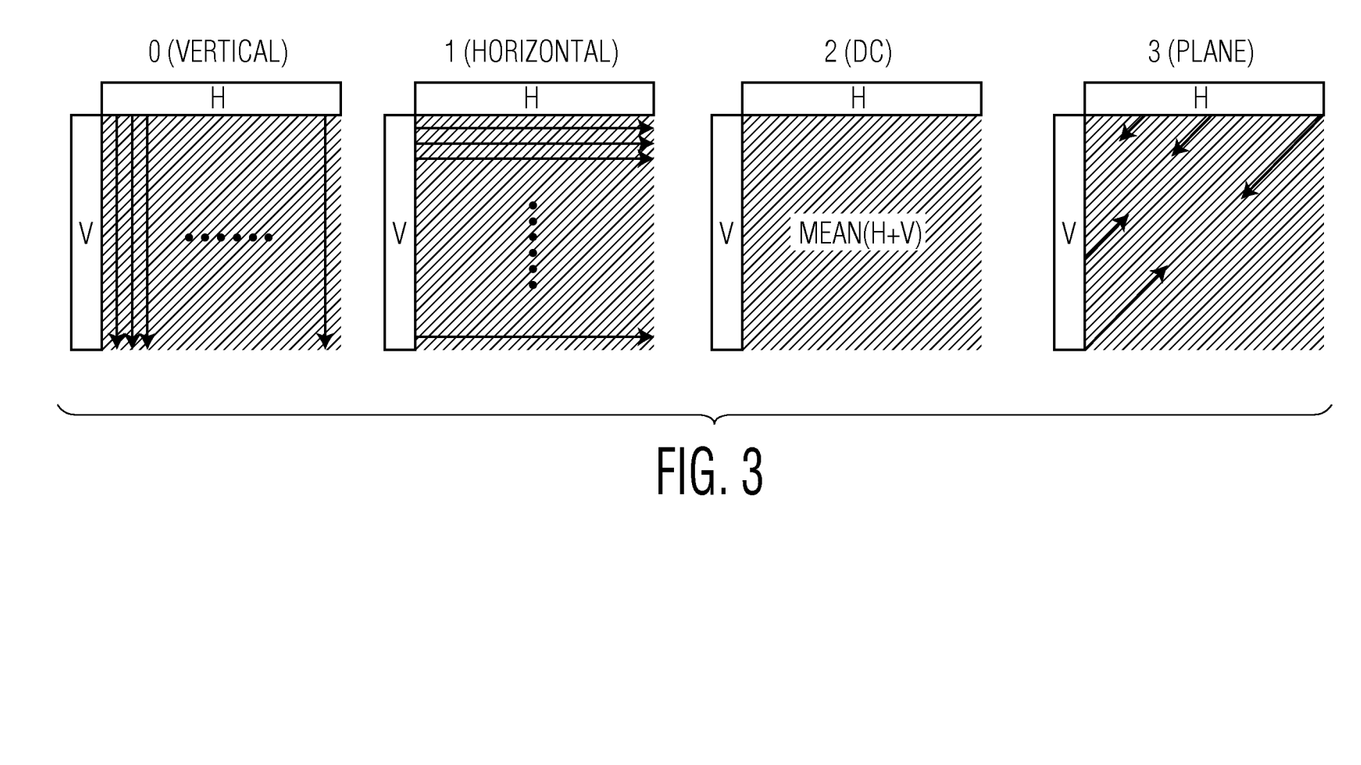
FIG. 3 illustrates four intra prediction modes for a 16×16 block of luminance pixels according to H.264 video compression standard.

FIG. 3 illustrates four intra prediction modes for a 16×16 block of luminance pixels according to H.264 video compression standard. As shown in FIG. 3, the four intra prediction modes include a vertical prediction mode, a horizontal prediction mode, a DC prediction mode, and a plane prediction mode. In the four intra prediction modes, top horizontal (H) reference luma pixel blocks and left vertical (V) reference luma pixel blocks are used to performing predictive coding on the 16×16 block of luminance pixels. In the vertical prediction mode, also referred to as Mode 0, predictive coding is performed on the 16×16 block of luminance pixels along the vertical direction using the top reference pixel blocks. In the horizontal prediction mode, also referred to as Mode 1, predictive coding is performed on the 16×16 block of luminance pixels along the horizontal direction using the left reference pixel blocks. In the DC prediction mode, also referred to as Mode 2, predictive coding is performed on the 16×16 block of luminance pixels using the mean of the top reference pixel blocks and the left reference pixel blocks. In the plane prediction mode, also referred to as Mode 3, predictive coding is performed on the 16×16 block of luminance pixels using a linear function of the top reference pixel blocks and the left reference pixel blocks.

In the mixed 16×16 intra mode, also referred to as the hybrid 16×16 intra mode, the coding unit 112 selects a set of 4×4 luminance pixel blocks from the sixteen luminance pixel blocks B1-B16 that depends which of the pixels blocks of the predefined reference group of luminance pixel blocks T1, T2, T3, T4, L1, L2, L3 and L4, if any, are available. Then, the coding unit performs predictive coding on the selected luminance pixel blocks in multiple prediction modes that are selected from nine intra prediction modes for a 4×4 block of luminance (luma) pixel according to H.264 video compression standard. Additional bits may be coded to indicate the selected prediction modes. The nine intra prediction modes for a 4×4 block of luminance pixels according to H.264 video compression standard are described below with reference to FIG. 4. The selection of the prediction modes is dependent on the specific availability of the reference luminance pixel blocks. The coding unit then uses the selected luminance pixel blocks and the available reference luminance pixel blocks of the predefined reference group of luminance pixel blocks T1, T2, T3, T4, L1, L2, L3 and L4 to perform predictive coding on the rest of the sixteen luminance pixel blocks B1-B16 in at least one prediction mode of the four prediction modes of FIG. 3 and the nine prediction modes of FIG. 4, which may be dependent on the data orientation of the rest of the luminance pixel blocks B1-B16. In some embodiments, the coding unit may explicitly specify a prediction mode for the rest of the sixteen luminance pixel blocks B1-B16 regardless of the data orientation.

Figure 4:
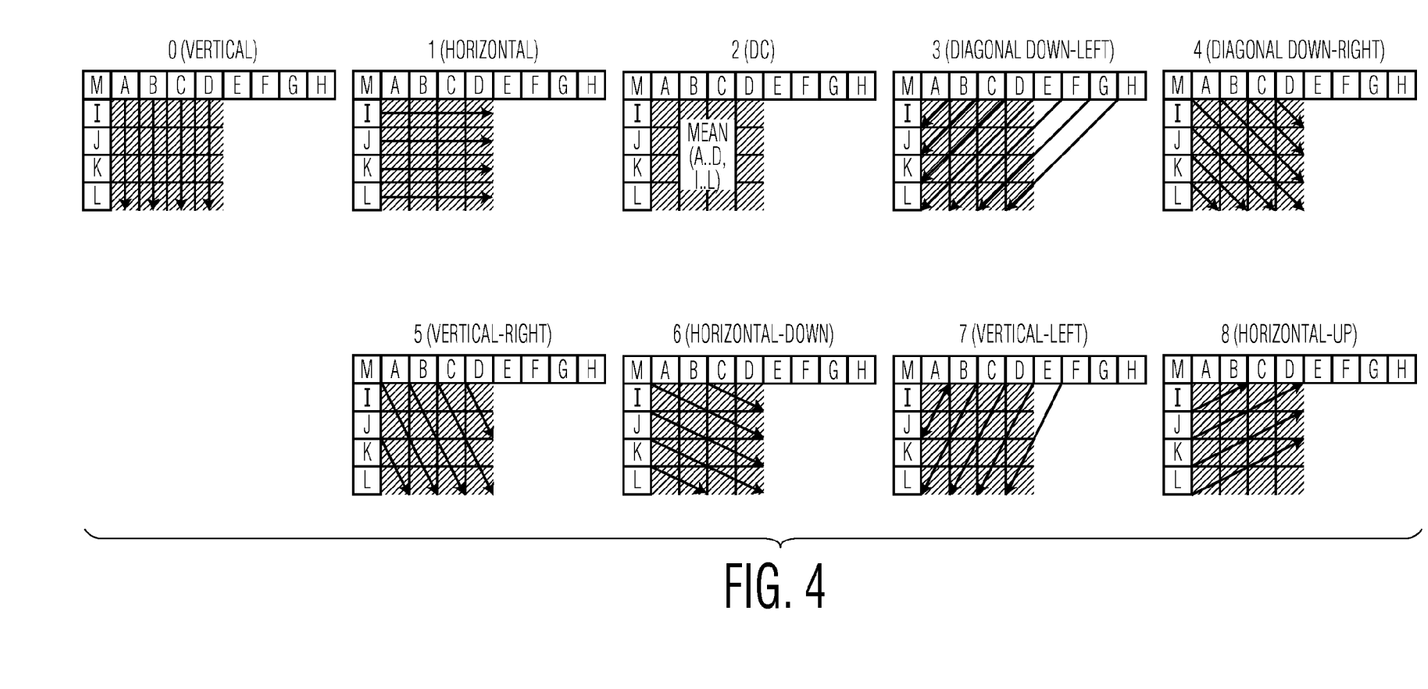
FIG. 4 illustrates nine intra prediction modes for a 4×4 block of luminance pixels according to H.264 video compression standard.

FIG. 4 illustrates nine intra prediction modes for a 4×4 block of luminance pixels according to H.264 video compression standard. As shown in FIG. 4, the nine intra prediction modes include a vertical prediction mode, a horizontal prediction mode, a DC prediction mode, a diagonal down-left prediction mode, a diagonal down-right prediction mode, a vertical-right prediction mode, a horizontal-down prediction mode, a vertical-left prediction mode, and a horizontal-up prediction mode. Reference luminance pixels A-M are used to performing predictive coding on the 4×4 block of luminance pixels in the nine intra prediction modes. In the vertical prediction mode, also referred to as 4×4 Mode 0, predictive coding is performed on the 4×4 block of luminance pixels along the vertical direction using top reference pixel A-D. In the horizontal prediction mode, also referred to as 4×4 Mode 1, predictive coding is performed on the 4×4 block of luminance pixels along the horizontal direction using left reference pixel I-L. In the DC prediction mode, also referred to as 4×4 Mode 2, predictive coding is performed on the 4×4 block of luminance pixels using the mean of the top reference pixels A-D and the left reference pixels I-L. In the diagonal down-left prediction mode, also referred to as 4×4 Mode 3, predictive coding is performed on the 4×4 block of luminance pixels along the diagonal down-left direction using the reference pixels A-M. In the diagonal down-right prediction mode, also referred to as 4×4 Mode 4, predictive coding is performed on the 4×4 block of luminance pixels along the diagonal down-right direction using the reference pixels A-M. In the vertical-right prediction mode, also referred to as 4×4 Mode 5, predictive coding is performed on the 4×4 block of luminance pixels along the vertical-right direction using the reference pixels A-M. In the horizontal-down prediction mode, also referred to as 4×4 Mode 6, predictive coding is performed on the 4×4 block of luminance pixels along the horizontal-down direction using the reference pixels A-M. In the vertical-left prediction mode, also referred to as 4×4 Mode 7, predictive coding is performed on the 4×4 block of luminance pixels along the vertical-left direction using the reference pixels A-M. In the horizontal-up prediction mode, also referred to as 4×4 Mode 8, predictive coding is performed on the 4×4 block of luminance pixels along the horizontal-up direction using the reference pixels A-M.

Referring back to FIG. 2, in certain circumstances, some or all of the predefined reference luminance pixel blocks T1, T2, T3, T4, L1, L2, L3 and L4 may not be available. For example, an intra macroblock may be present in inter frames and the neighboring pixels that are coded using other coding type such as inter coding or switchable intra coding may not be allowed to be used as reference to code the intra macroblock. The predefined reference luminance pixel blocks may be in switchable intra macroblocks and the target pixel blocks may be not in switchable intra macroblocks. An intra macroblock may be present on a slice boundary or a slice group boundary, where some or all of the reference pixels may not be available. A collection of macroblocks forms a slice, where the macroblocks present in the slice are not dependent on the macroblocks that are not contained in the slice. A collection of slices forms a slice group. An intra macroblock may be present at the frame boundaries where some or all of the reference pixels may not be available.

Three scenarios of the availability of the predefined reference luminance pixel blocks T1, T2, T3, T4, L1, L2, L3 and L4 are considered for the operation of the system 100 of FIG. 1. The first scenario is that four top horizontal reference luminance pixel blocks T1, T2, T3 and T4 (the horizontal subgroup of pixels) are not available. The second scenario is that four left vertical reference luminance pixel blocks L1, L2, L3 and L4 (the vertical subgroup of pixels) are not available. The third scenario is that all of the predefined reference luminance pixel blocks T1, T2, T3, T4, L1, L2, L3 and L4 are not available.

Under the first scenario, the determining unit 110 informs the coding unit 112 that the four top reference luminance pixel blocks T1-T4 are not available. Then, the coding unit performs predictive coding on the luminance pixel blocks B1-B16 in either an unmixed 16×16 intra mode or a mixed 16×16 intra mode.

In the unmixed 16×16 intra mode under the first scenario, the coding unit 112 selects four 4×4 luminance pixel blocks B1-B4, the top row of the sixteen 4×4 luminance pixel blocks B1-B16. Then, the coding unit performs predictive coding on the four luminance pixel blocks B1-B4 in an allowed prediction mode of the four intra prediction modes for a 16×16 block of luminance pixels according to H.264 video compression standard described in FIG. 3. When the four top reference luminance pixel blocks T1-T4 are not available, the horizontal prediction mode (Mode 1) and the DC prediction mode (Mode 2) described in FIG. 3 are allowed according to H.264 video compression standard with regard to predictive coding on a 16×16 block of luminance pixels.

In the mixed 16×16 intra mode under the first scenario, the coding unit 112 selects the four luminance pixel blocks B1-B4, the top row of the sixteen 4×4 luminance pixel blocks B1-B16. Then, the coding unit performs predictive coding on the luminance pixel blocks B1-B4 in multiple allowed prediction modes for a 4×4 block of luminance pixels according to H.264 video compression standard described in FIG. 4. When the four top reference luminance pixel blocks T1-T4 are not available, the horizontal prediction mode (4×4 Mode 1), the diagonal down-left prediction mode (4×4 Mode 3), the vertical-left prediction mode (4×4 Mode 7), and the DC prediction mode (4×4 Mode 2) described in FIG. 4 are allowed according to H.264 video compression standard with regard to predictive coding on a 4×4 block of luminance pixels. For example, predictive coding in the horizontal prediction mode may be performed on the luminance pixel blocks B1-B2 and predictive coding in the DC prediction mode may be performed on the luminance pixel blocks B3-B4. In some embodiments, predictive coding on luminance pixel blocks B1-B4 is performed using a single prediction mode, which may be one of the nine prediction modes of FIG. 4. In these embodiments, where the same prediction mode is being used for 4×4 luminance blocks, the prediction mode is collectively specified for the 4×4 luminance blocks as compared to H.264 specification of individually specifying a prediction mode for each 4×4 block.

In both the unmixed 16×16 intra mode and the mixed 16×16 intra mode under the first scenario, the decoding unit 113 reconstructs the luminance pixel blocks B1-B4 and the available reference luminance pixel blocks L1-L4. The coding unit 112 performs predictive coding on the rest of the 16×16 block of luminance pixels, the luminance pixel blocks B5-B16 under the first scenario, in at least one prediction mode, which may be one of the four prediction modes of FIG. 3 and may be dependent on the data orientation of the luminance pixel blocks B5-B16. For example, when the luminance pixel blocks B5-B16 are oriented along the vertical direction, the luminance pixel blocks B5-B16 are coded according to the vertical prediction mode of FIG. 3 and when the luminance pixel blocks B5-B16 are oriented according to a two dimensional plane, the luminance pixel blocks B5-B16 are coded according to the plane prediction mode of FIG. 3. In some embodiments, predictive coding on luminance pixel blocks B5-B16 is performed, in at least one prediction mode, which may be one of the nine prediction modes of FIG. 4 and may be dependent on the data orientation of the luminance pixel blocks B5-B16. In these embodiments, where the same prediction mode is being used for 4×4 luminance blocks, the prediction mode is collectively specified for the 4×4 luminance blocks as compared to H.264 specification of individually specifying a prediction mode for each 4×4 block.

Figure 5:
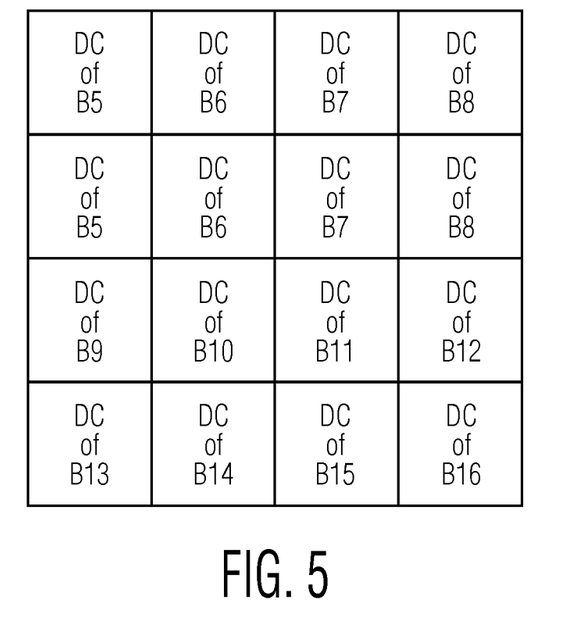
FIG. 5 depicts an exemplary 4×4 array that includes DC coefficients (Amplitude of zero frequencies) of luminance pixel blocks B5-B16 of FIG. 2 under a first scenario.

In both the unmixed 16×16 intra mode and the mixed 16×16 intra mode under the first scenario, the transforming module 104 performs a transform, such as a discrete cosine transform, on residual data of the luminance pixel blocks B1-B16. Since the DC coefficients (amplitude of zero frequency) of the luminance pixel blocks B1-B16 are likely correlated, the DC coefficients (DCs) of the luminance pixel blocks B1-B16 can be further compressed as follows. If the pixel blocks B1-B4 are coded using the same prediction mode and the same reference group of pixels, the transforming module transforms the DC coefficients of the luminance pixel blocks B1-B4 using a one dimensional four point transform, such as a Hadamard transform. The quantization module 106 then quantizes the transformed coefficients to generate run-length symbols. The entropy coding module 108 then entropy codes the run length symbols. The DC coefficients of the luminance pixel blocks B5-B16 are placed in a 4×4 array and the first row of the 4×4 array is generated by duplicating the values of the second row into the first row. FIG. 5 depicts an exemplary 4×4 array that includes DC coefficients of the luminance pixel blocks B5-B16 of FIG. 2 under the first scenario. As shown in FIG. 5, the first row of the exemplary 4×4 array is duplicated from the second row of the exemplary 4×4 array. The 4×4 array of DC coefficients is then transformed, quantized and run-length entropy coded. In some embodiments, the transforming module may perform a 16×16 two dimensional discrete cosine transform on the residual data of the luminance pixel blocks B1-B16, where residual data is generated using only the predefined reference group of pixels.

Under the second scenario, the determining unit 110 informs the coding unit 112 that the four left vertical reference luminance pixel blocks L1-L4 are not available. Then, the coding unit performs predictive coding on the luminance pixel blocks B1-B16 in either an unmixed 16×16 intra mode or a mixed 16×16 intra mode.

In the unmixed 16×16 intra mode under the second scenario, the coding unit 112 selects four luminance pixel blocks B1, B5, B9 and B13, the left column of the sixteen luminance pixel blocks B1-B16. Then, the coding unit performs predictive coding on the four luminance pixel blocks B1, B5, B9 and B13 in an allowed prediction mode of the four intra prediction modes for a 16×16 block of luminance pixels according to H.264 video compression standard described in FIG. 3. When the four left reference luminance pixel blocks L1-L4 are not available, the vertical prediction mode (Mode 0) and the DC prediction mode (Mode 2) described in FIG. 3 are allowed according to H.264 video compression standard with regard to predictive coding on a 16×16 block of luminance pixels.

In the mixed 16×16 intra mode under the second scenario, the coding unit 112 selects four luminance pixel blocks B1, B5, B9 and B13, the left column of the luminance pixel blocks B1-B16. Then, the coding unit performs predictive coding on the luminance pixel blocks B1, B5, B9 and B13 in multiple allowed prediction modes for a 4×4 block of luminance pixels according to H.264 video compression standard described in FIG. 4. When the four left reference luminance pixel blocks L1-L4 are not available, the vertical prediction mode (4×4 Mode 0), the horizontal-up prediction mode (4×4 Mode 8) and the DC prediction mode (4×4 Mode 2) described in FIG. 4 are allowed according to H.264 video compression standard with regard to predictive coding on a 4×4 block of luminance pixels. For example, predictive coding in the vertical prediction mode may be performed on the luminance pixel blocks B1 and B5 and predictive coding in the DC prediction mode may be performed on the luminance pixel blocks B9 and B13. In some embodiments, predictive coding on luminance pixel blocks B1, B5, B9 and B13 is performed using a single prediction mode, which may be one of the nine prediction modes of FIG. 4. In these embodiments, where the same prediction mode is being used for 4×4 luminance blocks, the prediction mode is collectively specified for the 4×4 luminance blocks as compared to H.264 specification of individually specifying a prediction mode for each 4×4 block.

In both the unmixed 16×16 intra mode and the mixed 16×16 intra mode under the second scenario, the decoding unit 113 reconstructs the luminance pixel blocks B1, B5, B9 and B13 and the available reference luminance pixel blocks T1-T4. The coding unit 112 performs predictive coding on the rest of the sixteen pixel blocks B1-B16, the luminance pixel blocks B2, B3, B4, B6, B7, B8, B10, B11, B12, B14, B15 and B16 under the second scenario, in at least one prediction mode, which may be one of the four prediction modes of FIG.

3 and may be dependent on the data orientation of the rest of the luminance pixel blocks B1-B16, the luminance pixel blocks B2, B3, B4, B6, B7, B8, B10, B11, B12, B14, B15 and B16. For example, when the rest of the pixel blocks B1-B16, the luminance pixel blocks B2, B3, B4, B6, B7, B8, B10, B11, B12, B14, B15 and B16, are oriented along the horizontal direction, the pixel blocks are coded according to the horizontal prediction mode of FIG. 3. As another example, when the rest of the pixel blocks B1-B16 are oriented according to a two dimensional plane, these pixel blocks are coded according to the plane prediction mode of FIG. 3. In some embodiments, predictive coding on rest of the pixel blocks B1-B16, the luminance pixel blocks B2, B3, B4, B6, B7, B8, B10, B11, B12, B14, B15 and B16, is performed in at least one prediction mode, which may be one of the nine prediction modes of FIG. 4 and may be dependent on the data orientation of these pixel blocks. In these embodiments, where the same prediction mode is being used for 4×4 luminance blocks, the prediction mode is collectively specified for the 4×4 luminance blocks as compared to H.264 specification of individually specifying a prediction mode for each 4×4 block.

Figure 6:
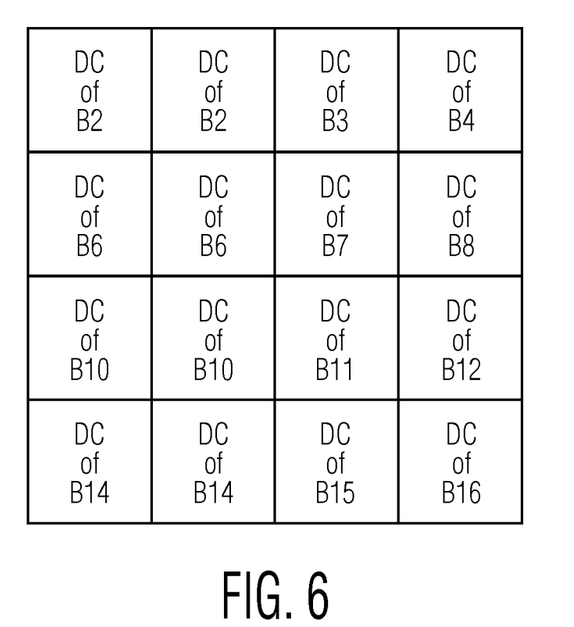
FIG. 6 depicts an exemplary 4×4 array that includes DC coefficients of luminance pixel blocks B2, B3, B4, B6, B7, B8, B10, B11, B12, B14, B15 and B16 of FIG. 2 under a second scenario.

In both the unmixed 16×16 intra mode and the mixed 16×16 intra mode under the second scenario, the transforming module 104 performs transform on residual data of the luminance pixel blocks B1-B16. For example, the transforming module may perform a transform, such as a discrete cosine transform, on the residual data of the luminance pixel blocks B1-B16. Since the DC coefficients of the luminance pixel blocks B1-B16 are likely correlated, the DC coefficients of the luminance pixel blocks B1-B16 can be further compressed as follows. If the pixel blocks B1, B5, B9 and B13 are coded using the same prediction mode and the same reference group of pixels, the transforming module transforms the DC coefficients of the luminance pixel blocks B1, B5, B9 and B13 using a one dimensional four point transform, such as Hadamard Transform. The quantization module 106 then quantizes the transformed coefficients to generate run-length symbols. The entropy coding module 108 then entropy codes the run length symbols. The DC coefficients of the rest of the luminance pixel blocks B1-B16, the luminance pixel blocks B2, B3, B4, B6, B7, B8, B10, B11, B12, B14, B15 and B16 under the second scenario, are placed in a 4×4 array and the first column of the 4×4 array is generated by duplicating the values of the second column into the first column. FIG. 6 depicts an exemplary 4×4 array that includes DC coefficients of the luminance pixel blocks B2, B3, B4, B6, B7, B8, B10, B11, B12, B14, B15 and B16 of FIG. 2 under the second scenario. As shown in FIG. 6, the first column of the exemplary 4×4 array is duplicated from the second column. The 4×4 array of DC coefficients is then transformed, quantized and run-length entropy coded. In some embodiments, the transforming module may perform a 16×16 two dimensional discrete cosine transform on the residual data of the luminance pixel blocks B1-B16, where residual data is generated using only the predefined reference group of pixels.

Under the third scenario, the determining unit 110 informs the coding unit 112 that all of the predefined reference luminance pixel blocks T1-T4 and L1-L4 are not available. Then, the coding unit performs predictive coding on the luminance pixel blocks B1-B16 in either an unmixed 16×16 intra mode or a mixed 16×16 intra mode.

In the unmixed 16×16 intra mode under the third scenario, the coding unit 112 selects seven luminance pixel blocks B1-B5, B9 and B13, the top row and the left column of the sixteen luminance pixel blocks B1-B16. Then, the coding unit performs predictive coding on the seven luminance pixel blocks B1-B5, B9 and B13 in an allowed prediction mode of the four intra prediction modes for a 16×16 block of luminance pixels according to H.264 video compression standard described in FIG. 3. When all of the predefined reference luminance pixels blocks T1-T4 and L1-L4 are not available, the DC prediction mode (Mode 2) described in FIG. 3 is allowed according to H.264 video compression standard with regard to predictive coding on a 16×16 block of luminance pixels.

In the mixed 16×16 intra mode under the third scenario, the coding unit 112 selects seven luminance pixel blocks B1-B5, B9 and B13, the top row and the left column of the sixteen luminance pixel blocks B1-B16. Then, the coding unit performs predictive coding on the luminance pixel blocks B1-B5, B9 and B13 in multiple allowed prediction modes for a 4×4 block of luminance pixels according to H.264 video compression standard described in FIG. 4. When all of the predefined reference luminance pixels blocks T1-T4 and L1-L4 are not available, the DC prediction mode (4×4 Mode 2) for block B1; the vertical prediction mode (4×4 Mode 0), the horizontal-up prediction mode (4×4 Mode 8) and the DC prediction mode (4×4 Mode 2) for blocks B2, B3, B4; the horizontal prediction mode (4×4 Mode 1), the diagonal down-left prediction mode (4×4 Mode 3), the vertical-left prediction mode (4×4 Mode 7) and the DC prediction mode (4×4 Mode 2) for blocks B5, B9, B13, as described in FIG. 4 are allowed according to H.264 video compression standard with regard to predictive coding on a 4×4 block of luminance pixels. In some embodiments, predictive coding on luminance pixel blocks B2, B3, B4, B5, B9 and B13 is performed using a single prediction mode, which may be one of the nine prediction modes of FIG. 4. In these embodiments, where the same prediction mode is being used for 4×4 luminance blocks, the prediction mode is collectively specified for the 4×4 luminance blocks as compared to H.264 specification of individually specifying a prediction mode for each 4×4 block.

In both the unmixed 16×16 intra mode and the mixed 16×16 intra mode under the third scenario, the decoding unit 113 reconstructs the luminance pixel blocks B1-B5, B9 and B13. The coding unit 112 performs predictive coding on the rest of the sixteen luminance pixel blocks B1-B16, the luminance pixel blocks B6, B7, B8, B10, B11, B12, B14, B15 and B16 under the third scenario, in at least one prediction mode, which may be one of the four prediction mode of FIG. 3 and may be dependent on the data orientation of the rest of the luminance pixel blocks B1-B16, the luminance pixel blocks B6, B7, B8, B10, B11, B12, B14, B15 and B16. As an example, when the rest of the luminance pixel blocks B1-B16, the luminance pixel blocks B6, B7, B8, B10, B11, B12, B14, B15 and B16, are oriented along the horizontal direction, these luminance pixel blocks are coded according to the horizontal prediction mode of FIG. 3. As another example, when the rest of the luminance pixel blocks B1-B16, the luminance pixel blocks B6, B7, B8, B10, B11, B12, B14, B15 and B16, are oriented along the vertical direction, these luminance pixel blocks are coded according to the vertical prediction mode of FIG. 3. As another example, when the rest of the luminance pixel blocks B1-B16, the luminance pixel blocks B6, B7, B8, B10, B11, B12, B14, B15 and B16, are oriented according to a two dimensional plane, these luminance pixel blocks are coded according to the plane prediction mode of FIG. 3. In some embodiments, predictive coding on rest of the pixel blocks B1-B16, the luminance pixel blocks B6, B7, B8, B10, B11, B12, B14, B15 and B16, is performed in at least one prediction mode, which may be one of the nine prediction modes of FIG. 4 and may be dependent on the data orientation of these pixel blocks. In these embodiments, where the same prediction mode is being used for 4×4 luminance blocks, the prediction mode is collectively specified for the 4×4 luminance blocks as compared to H.264 specification of individually specifying a prediction mode for each 4×4 block.

Figure 7:
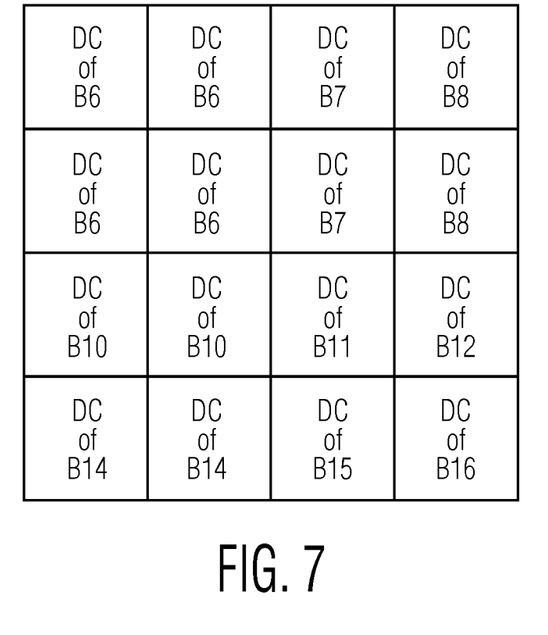
FIG. 7 depicts an exemplary 4×4 array that includes DC coefficients of luminance pixel blocks B6, B7, B8, B10, B11, B12, B14, B15 and B16 of FIG. 2 under a third scenario.

In both the unmixed 16×16 intra mode and the mixed 16×16 intra mode under the third scenario, the transforming module 104 performs a transform, such as a discrete cosine transform, on residual data of the luminance pixel blocks B1-B16. Since the DC coefficients of the luminance pixel blocks B1-B16 are likely correlated, the DC coefficients of the luminance pixel blocks B1-B16 can be further compressed as follows. If the pixel blocks B1-B5, B9 and B13 are coded using the same prediction mode and the same reference group of pixels, the transforming module transforms the DC coefficients of the luminance pixel blocks B1-B5, B9 and B13 along the horizontal and vertical directions using a one dimensional four point transform, such as a Hadamard Transform. The quantization module 106 then quantizes the transformed coefficients to generate run-length symbols. The entropy coding module 108 then entropy codes the run length symbols. The DC coefficients of the rest of the sixteen luminance pixel blocks, the luminance pixel blocks B6, B7, B8, B10, B11, B12, B14, B15 and B16 under the third scenario, are placed in a 4×4 array. The first row of the 4×4 array is generated by duplicating the values of the second row into the first row, and the first column the 4×4 array is generated by duplicating the values of the second column into the first column. FIG. 7 depicts an exemplary 4×4 array that includes DC coefficients of the luminance pixel blocks B6, B7, B8, B10, B11, B12, B14, B15 and B16 of FIG. 2 under the third scenario. As shown in FIG. 7, the first row is generated by duplicating the values of the second row into the first row and the first column is generated by duplicating the values of the second column into the first column. The 4×4 array of DC coefficients is then transformed, quantized and run-length entropy coded. In some embodiments, the transforming module may perform a 16×16 two dimensional discrete cosine transform on the residual data of the luminance pixel blocks B1-B16, where residual data is generated using only the predefined reference group of pixels.

An example of the operation of the system 100 for intra-compression of FIG. 1 on the exemplary target group of pixels and the corresponding predefined reference group of pixels of FIG. 2 is described below. The determining unit 110 determines whether all the reference pixel blocks are available and informs the coding unit 112 the availability of the reference pixel blocks. If the determining unit determines that all of the reference pixel blocks are available, the coding unit performs predictive coding on the luminance pixel blocks B1-B16 according to one of the four intra prediction modes described with reference to FIG. 3. If the determining unit determines that the availability of the reference data blocks falls into one of the three scenarios described above, the coding unit performs predictive coding on the luminance pixel blocks B1-B16 in either an unmixed 16×16 intra mode or a mixed 16×16 intra mode under the determined scenario as described above. One mixed/unmixed bit is coded to indicate whether the unmixed 16×16 intra mode or the mixed 16×16 intra mode is used. Prediction mode of the rest of the target group of pixels is placed first in the bitstream followed by the mixed/unmixed bit and prediction mode of the set of pixels. If the prediction mode of the entire target group of pixels is specified as the prediction mode of the rest of the target pixels, a video decoder may determine in which prediction mode, i.e. the H.264 specified mode or the prediction mode according to an embodiment of the invention, the target group of pixels has been coded by determining the possibilities of prediction modes on the basis of availability of the predefined reference group of pixels. The transforming module 104 then perform a transform on the residual data to generate transformed residual data, the quantization module 106 quantizes the transformed residual data to generate quantized transformed residual data, and the entropy coding module 108 entropy codes the quantized transformed residual data under the determined scenario as described above.

Figure 8:
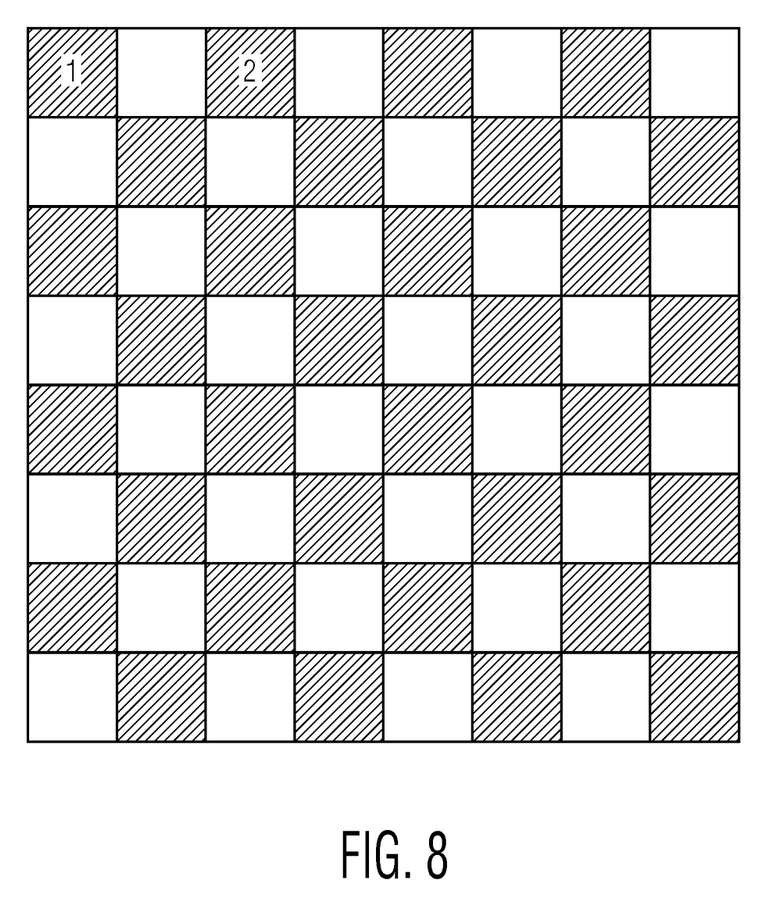
FIG. 8 and FIG. 9 depict two exemplary slice groups for the system of FIG. 1.
Figure 9:
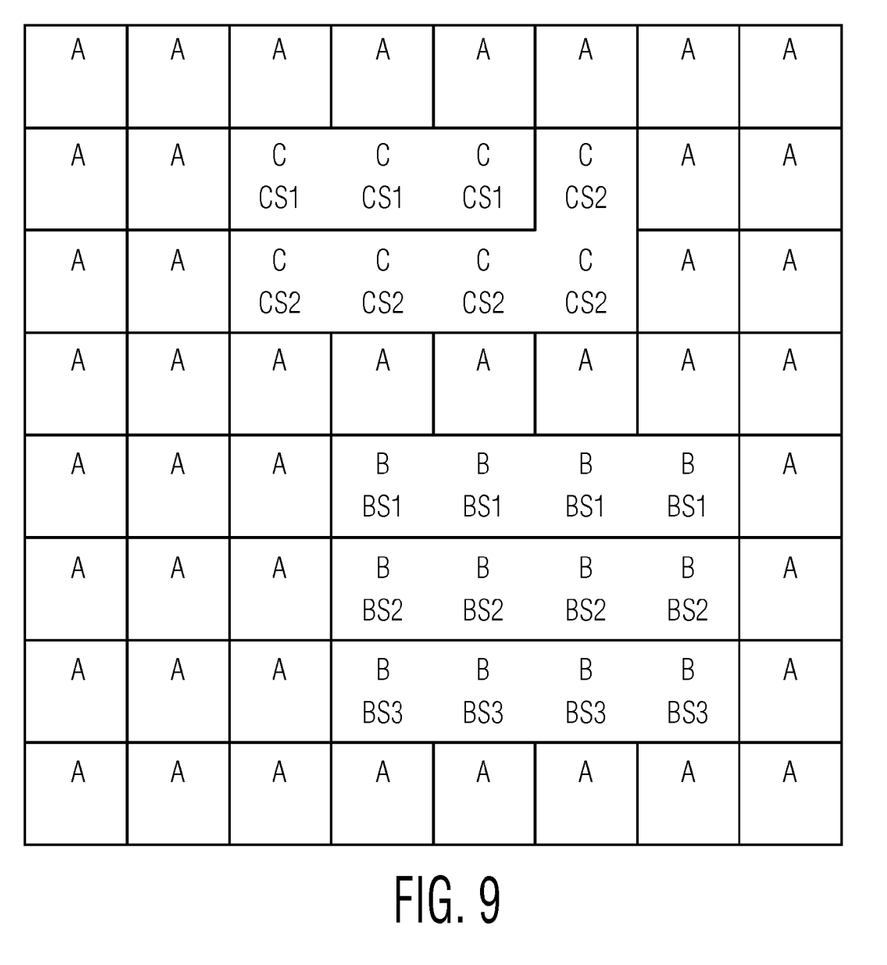

Slices and slice groups may limit video frame compression efficiency and the system 100 of FIG. 1 compensates for the reduction in video frame compression efficiency. For example, reference pixels are not available for the macroblocks that are located on a slice, slice group or frame boundary and the achievable compression is limited. The system 100 of FIG. 1 utilizes some pixels of such macroblocks of a video frame as reference pixels to perform predictive coding on the rest of the macroblock when some or all predefined reference pixels for performing predictive coding on the macroblock are not available in the video frame. FIG. 8 and FIG. 9 depict two exemplary slice groups for the system of FIG. 1. As shown in FIG. 8, each block is a macroblock and a frame includes two slice groups. The black macroblocks are in a first slice group and the white macroblocks are in a second slice group. As shown in FIG. 9, each block is a macroblock and a frame includes three slice groups A, B, and C. The macroblocks labeled with "A" are in the slice group A, the macroblocks labeled with "B" are in the slice group B, and the macroblocks labeled with "C" are in the slice group C. The slice group B includes three slices, BS1, BS2, and BS3. The macroblocks labeled with "BS1" are in the slice BS1 of the slice group B, the macroblocks labeled with "BS2" are in the slice BS2 of the slice group B, and the macroblocks labeled with "BS3" are in the slice BS3 of the slice group B. The slice group C includes two slices, CS1 and CS2. The macroblocks labeled with "CS1" are in the slice CS1 of the slice group C and the macroblocks labeled with "CS2" are in the slice CS2 of the slice group C. Macroblocks may be randomly assigned to slice groups and a map that maps macro blocks to slice groups in a frame may be required. For example, the location of the second macroblock of the first slice group in FIG. 8 is the third macroblock in the frame.

The intra 8×8 block of chrominance pixels can be compressed in a similar manner as the 16×16 block of luminance pixels as both of these blocks use the same prediction modes. The intra 8×8 block of luminance can also be compressed in a similar manner as the 16×16 block of luminance pixels with minor modifications that are obvious according to the above described examples for the 16×16 block of luminance pixels.

Figure 10:
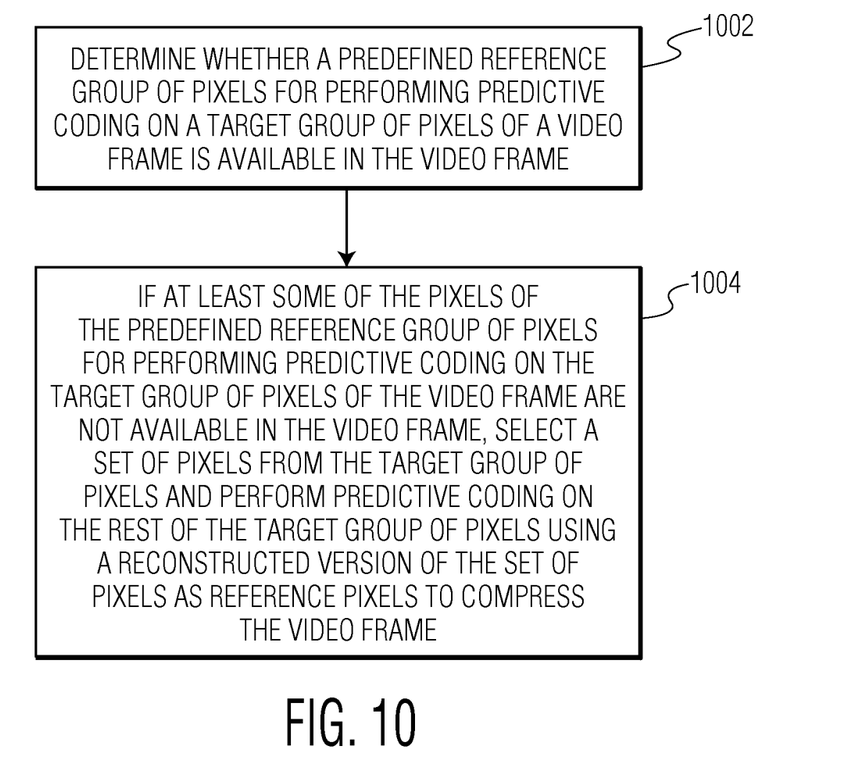
FIG. 10 is a process flow diagram of a method for intra-frame compression accordance with an embodiment of the invention.

FIG. 10 is a process flow diagram of a method for intra-frame compression accordance with an embodiment of the invention. At block 1002, whether a predefined reference group of pixels for performing predictive coding on a target group of pixels of a video frame is available in the video frame is determined, where the predefined reference group of pixels is not a part of the target group of pixels. At block 1004, if at least some of the pixels of the predefined reference group of pixels for performing predictive coding on the target group of pixels of the video frame are not available in the video frame, a set of pixels from the target group of pixels is selected and predictive coding is performed on the rest of the target group of pixels using a reconstructed version of the set of pixels to compress the video frame.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for intra-frame compression, the method comprising:
    determining whether a predefined reference group of pixels for performing predictive coding on a target group of pixels of a video frame is available in the video frame, the predefined reference group of pixels not being a part of the target group of pixels; and
    if at least some of the pixels of the predefined reference group of pixels for performing predictive coding on the target group of pixels of the video frame are not available in the video frame, selecting a set of pixels from the target group of pixels and performing predictive coding on the rest of the target group of pixels using a reconstructed version of the set of pixels as reference pixels to compress the video frame.

2. The method of claim 1, wherein the target group of pixels is a rectangular block of pixels, the predefined reference group of pixels bordering the left edge and the top edge of the rectangular block of pixels.

3. The method of claim 1, wherein the performing the predictive coding on the rest of the target group of pixels includes performing the predictive coding on the rest of the target group of pixels in at least one prediction mode.

4. The method of claim 1, further comprising performing predictive coding on the set of pixels using at least available pixels among the predefined reference group of pixels in at least one prediction mode.

5. The method of claim 4, wherein the performing the predictive coding on the set of pixels includes performing the predictive coding on the set of pixels using at least the available pixels among the predefined reference group of pixels in multiple prediction modes.

6. The method of claim 4, wherein the performing the predictive coding on the rest of the target group of pixels includes performing the predictive coding on the rest of the target group of pixels in a prediction mode that differs from the at least one prediction mode performed on the set of pixels.

7. The method of claim 1, wherein the performing the predictive coding on the rest of the target group of pixels includes performing the predictive coding on the rest of the target group of pixels in a prediction mode according to a data orientation of the rest of the target group of pixels.

8. The method of claim 1, wherein the performing the predictive coding on the rest of the target group of pixels includes performing the predictive coding on the rest of the target group of pixels using at least the reconstructed version of the set of pixels and available pixels of the predefined reference group of pixels.

9. The method of claim 1, further comprising:
    placing a prediction mode of the rest of the target group of pixels in a bitstream, and
    placing a prediction mode of the set of pixels in the bitstream.

10. A system for intra-frame compression, the system comprising:
    a determining unit configured to determine whether a predefined reference group of pixels for performing predictive coding on a target group of pixels of a video frame is available in the video frame, the predefined reference group of pixels not being a part of the target group of pixels; and
    a coding unit configured to select a set of pixels from the target group of pixels and to perform predictive coding on the rest of the target group of pixels using a reconstructed version of the set of pixels as reference pixels to compress the video frame if at least some of the pixels of the predefined reference group of pixels for performing predictive coding on the target group of pixels of the video frame are not available in the video frame.

11. The system of claim 10, wherein the target group of pixels is a rectangular block of pixels, the predefined reference group of pixels bordering the left edge and the top edge of the rectangular block of pixels.

12. The system of claim 10, wherein the coding unit is configured to perform the predictive coding on the rest of the target group of pixels in at least one prediction mode.

13. The system of claim 10, wherein the coding unit is configured to perform predictive coding on the set of pixels using at least available pixels among the predefined reference group of pixels in at least one prediction mode.

14. The system of claim 13, wherein the coding unit is configured to perform the predictive coding on the set of pixels using at least the available pixels among the predefined reference group of pixels in multiple prediction modes.

15. The system of claim 13, wherein the coding unit is configured to perform the predictive coding on the rest of the target group of pixels in a prediction mode that is different from the at least one prediction mode performed on the set of pixels.

16. The system of claim 10, wherein the coding unit is configured to perform the predictive coding on the rest of the target group of pixels in a prediction mode according to a data orientation of the rest of the target group of pixels.

17. The system of claim 10, wherein the coding unit is configured to perform the predictive coding on the rest of the target group of pixels using at least the reconstructed version of the set of pixels and available pixels of the predefined reference group of pixels.

18. A method for intra-frame compression, the method comprising:
    determining whether a predefined reference group of pixels for performing predictive coding on a rectangular macroblock of pixels of a video frame is available in the video frame, the predefined reference group of pixels not being a part of the rectangular macroblock, the predefined reference group of pixels including a horizontal subgroup of pixels bordering one edge of the rectangular macroblock and a vertical subgroup of pixels bordering another edge of the rectangular macroblock; and
    if at least one of the horizontal and vertical subgroups of pixels of the predefined reference group of pixels for performing predictive coding on the rectangular macroblock of the video frame are not available in the video frame, selecting a set of pixels from the rectangular macroblock and performing predictive coding on the rest of the rectangular macroblock using a reconstructed version of the set of pixels as reference pixels to compress the video frame.

19. The method of claim 18, wherein the performing the predictive coding on the rest of the rectangular block of pixels includes performing the predictive coding on the rest of the rectangular block of pixels in at least one prediction mode.

20. The method of claim 18, further comprising performing predictive coding on the set of pixels using at least available pixels among the predefined reference group of pixels in multiple prediction modes.

* * * * *